(12) United States Patent
Ryan et al.

(10) Patent No.: US 9,978,024 B2
(45) Date of Patent: May 22, 2018

(54) WORKFLOW INTEGRATION WITH ADOBE™ FLEX™ USER INTERFACE

(75) Inventors: Thomas K. Ryan, Valley Center, CA (US); Neelesh V. Bansode, Bangalore (IN); Carl L. Christofferson, Escondido, CA (US)

(73) Assignee: Teradata US, Inc., Dayton, OH (US)

( * ) Notice: Subject to any disclaimer, the term of this patent is extended or adjusted under 35 U.S.C. 154(b) by 843 days.

(21) Appl. No.: 12/787,265

(22) Filed: May 25, 2010

(65) Prior Publication Data

US 2011/0078607 A1    Mar. 31, 2011

Related U.S. Application Data

(60) Provisional application No. 61/247,401, filed on Sep. 30, 2009.

(51) Int. Cl.
*G06F 17/30* (2006.01)
*G06Q 10/06* (2012.01)

(52) U.S. Cl.
CPC .................... *G06Q 10/06* (2013.01)

(58) Field of Classification Search
CPC ......... G06F 17/30592; G06F 17/30569; G06F 17/30011; G06F 17/3089; G06F 17/30867; G05B 19/418; G05B 2219/31396; G06Q 10/06; G06Q 10/10
USPC .................................................. 707/608, 601
See application file for complete search history.

(56) References Cited

U.S. PATENT DOCUMENTS

| | | | | |
|---|---|---|---|---|
| 7,877,327 | B2* | 1/2011 | Gwiazda | G06F 17/3089 705/52 |
| 8,176,004 | B2* | 5/2012 | Malaney | G06Q 10/00 707/608 |
| 9,684,736 | B2* | 6/2017 | Kumar | G06F 17/30917 |
| 2004/0030741 | A1* | 2/2004 | Wolton | G06F 17/30873 709/202 |
| 2006/0026233 | A1* | 2/2006 | Tenembaum | A63F 13/12 709/205 |
| 2006/0195923 | A1* | 8/2006 | Eby | A01H 5/10 800/278 |
| 2008/0163283 | A1* | 7/2008 | Tan | H04N 7/163 725/20 |
| 2009/0235167 | A1* | 9/2009 | Boyer et al. | 715/708 |
| 2009/0249446 | A1* | 10/2009 | Jenkins | G06F 9/4443 726/3 |

(Continued)

*Primary Examiner* — Sheree Brown
(74) *Attorney, Agent, or Firm* — Gates & Cooper, LLP; Randy L. Campbell, Jr.

(57) ABSTRACT

A method, system, apparatus, and article of manufacture provides the ability to visualize master data management (MDM) data as part of a MDM workflow user interface (UI) in a computer system. MDM data resides in one or more tables of a relational database management system. An MDM system maintains, as part of a process and framework, a first process workflow to manage relationship data. The relationship data is data required to manage an association of one piece of MDM data to another piece of MDM data. A first process workflow provides a UI node that contains a link to a file that describes UI components to display when the first process workflow is executed. A first component of the UI component identifies an Adobe™ Flex™ based UI component. The Adobe™ Flex™ based UI component enables the representation and viewing of the MDM data in a hierarchy.

21 Claims, 4 Drawing Sheets

(56) References Cited

U.S. PATENT DOCUMENTS

| | | | |
|---|---|---|---|
| 2010/0094805 A1* | 4/2010 | Ingerman et al. | 707/609 |
| 2010/0191700 A1* | 7/2010 | Kumar | G06F 17/30917 707/602 |
| 2010/0192166 A1* | 7/2010 | Kumar | G06F 9/548 719/328 |
| 2010/0192220 A1* | 7/2010 | Heizmann | G06F 11/3664 726/19 |
| 2010/0268573 A1* | 10/2010 | Jain | G06Q 30/0203 705/7.32 |
| 2010/0281364 A1* | 11/2010 | Sidman | 715/713 |

\* cited by examiner

WORKFLOW INTEGRATION WITH ADOBE™ FLEX™ USER INTERFACE

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 61/247,401, filed Sep. 30, 2009, by Thomas K. Ryan, Neelesh Bansode, and Carl L. Christofferson, entitled "Workflow Integration with Adobe™ Flex™ User Interface".

BACKGROUND OF THE INVENTION

1. Field of the Invention

This invention relates in general to managing business critical data in a computer, and in particular, to viewing and manipulating a hierarchical form of such data.

2. Description of Related Art

Master Data Management™ (MDM) (also known as an MDM application), available from the assignee of the present invention, is an application that allows users to manage their business critical data. This critical data can originate from a myriad of sources and external feeds, but ultimately, the goal is that all of this data be consolidated into a central business data warehouse. Master Data Management™ is the process and framework for maintaining a series of business rules and process workflows that will manage this data as it feeds in from multiple sources. Master Data Management™ then applies these business rules and process workflows to produce "master" data, which is then fed to all consuming business processes.

Core to the management of master data is the definition of a data model. The data model serves as the foundation for all business rules and workflow processes within the Master Data Management™ (MDM) framework. The data model represents the form the master data must ultimately take in the customer's data warehouse to be used by the consuming business applications.

A significant portion of the business critical master data consists of "data relationship" data itself. Relationship data is the data required to manage the association of one piece of data (typically a data entity or table) to another. The Data Relationship can take the form of a hierarchy or a direct reference or any other association. Management of the relationship or association requires data and business processes that are key to the concept of Master Data Relationship Management.

MDM provides hierarchy management features that are built using the Adobe™ Flex™ technology (an open source framework for building highly interactive, expressive web applications). Adobe™ Flex™ technology is used to meet the rich user interface (UI) requirements of managing, visualizing and editing Master Data Relationships in the form of hierarchies.

Adobe™ provides an IDE (integrated development/design environment) named Flex Builder™ that can assist in building Flex™ based UI. Flex™ provides two programming languages:

MXML (.mxml files) to describe the visual layout; and
ActionScript (.as files) to include the business logic.

Adobe™ also provides an SDK (software development kit) that can be used for compiling code in the above programming languages. On compilation, the output is a swf file. Swf is the acronym for "Shockwave Flash" pronounced as swiff.

Most modern browsers have a plug-in for Flash™ (known as Flash Player™), installed on their computer. Flash Player™ enables users to run or play the swf files. Swf files can also be embedded in an html file for rendering on browsers.

Flex Builder™ produces a wrapper html file that has Javascript™ (js) code and swf file references in it. The Javascript™ code performs checks (e.g., the version of flash player, etc.).

While the Flex™ Hierarchy UI provides an important role from a representation and viewing perspective, the UI is required to be a part of the MDM data management workflows. A common requirement for customers in a MDM context is the ability to search for a certain entity, view it in the hierarchy and then launch a maintenance workflow for that record. However, since the Flex™ technology is different from the standard MDM UI framework (PGL [Page Layout], which is a J2EE [Java™ 2 Platform Enterprise Edition], HTML [hypertext markup language] based technology), there is no way for the PGL Workflow UI and Flex™ Hierarchy UI's to easily interact.

To solve the interaction problem, a method is needed to bridge the PGL Workflow UI and Adobe™ Flex™ technologies together. In addition, the flow of interaction must provide bi-directional support so that one can go from a PGL Workflow UI into a Flex™ UI, as well as from a Flex™ UI into a PGL Workflow UI.

Prior art methods/companies have generalized solutions for viewing and manipulating hierarchical data (e.g. StarBEAM™ available from Entreon™ Corporation). However, the prior art fails to provide a solution that integrates rich internet hierarchy UI's, the management of hierarchies, the visualization and direct manipulation of hierarchies and business process workflows into a Master Data Management solution.

SUMMARY OF THE INVENTION

One or more embodiments of the invention enhance the existing PGL Workflow UI framework to allow the hierarchy Flex™ UI to be incorporated into the PGL based workflows. This framework recognizes both the PGL elements and the Flex™ elements and allow data interchange between them. The PGL framework can be enhanced to include a new element (XML [extensible markup language] tag) that can identify the Flex™ component.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.
Overview One or more embodiments of the invention provide a framework that provides the ability to incorporate hierarchy Flex™ user interfaces into PGL based workflows.
Hardware and Software Environment Overview Master data (sometimes referred to as reference data) are facts that define a business entity, facts that may be used to model one or more definitions or view of an entity. Entity definitions based on master data provide business consistency and data integrity when multiple systems across an organization (or beyond) identify the same entity differently (e.g., in differing data models).

Business entities modeled via master data are usually customer, product, or finance. However, master data can define any entity, like employee, supplier, location, asset, claim, policy, patient, citizen, chart of accounts, etc.

A system of record is often created or selected (also referred to as a trusted source) as a central, authenticated master copy from which entity definitions (and physical data) are propagated among all systems integrated via a Master Data Management™ (MDM) framework.

The system of record can take many forms. Many users build a central database (e.g. a data warehouse or operational data store) as a hub through which master data, metadata, and physical data are synchronized. Some hubs are simply master files or tables that collect and collate records.

Regardless of the technology approach, embodiments of the invention provide the ability to deploy a system on any designated target system for testing or production.

Figure 1:
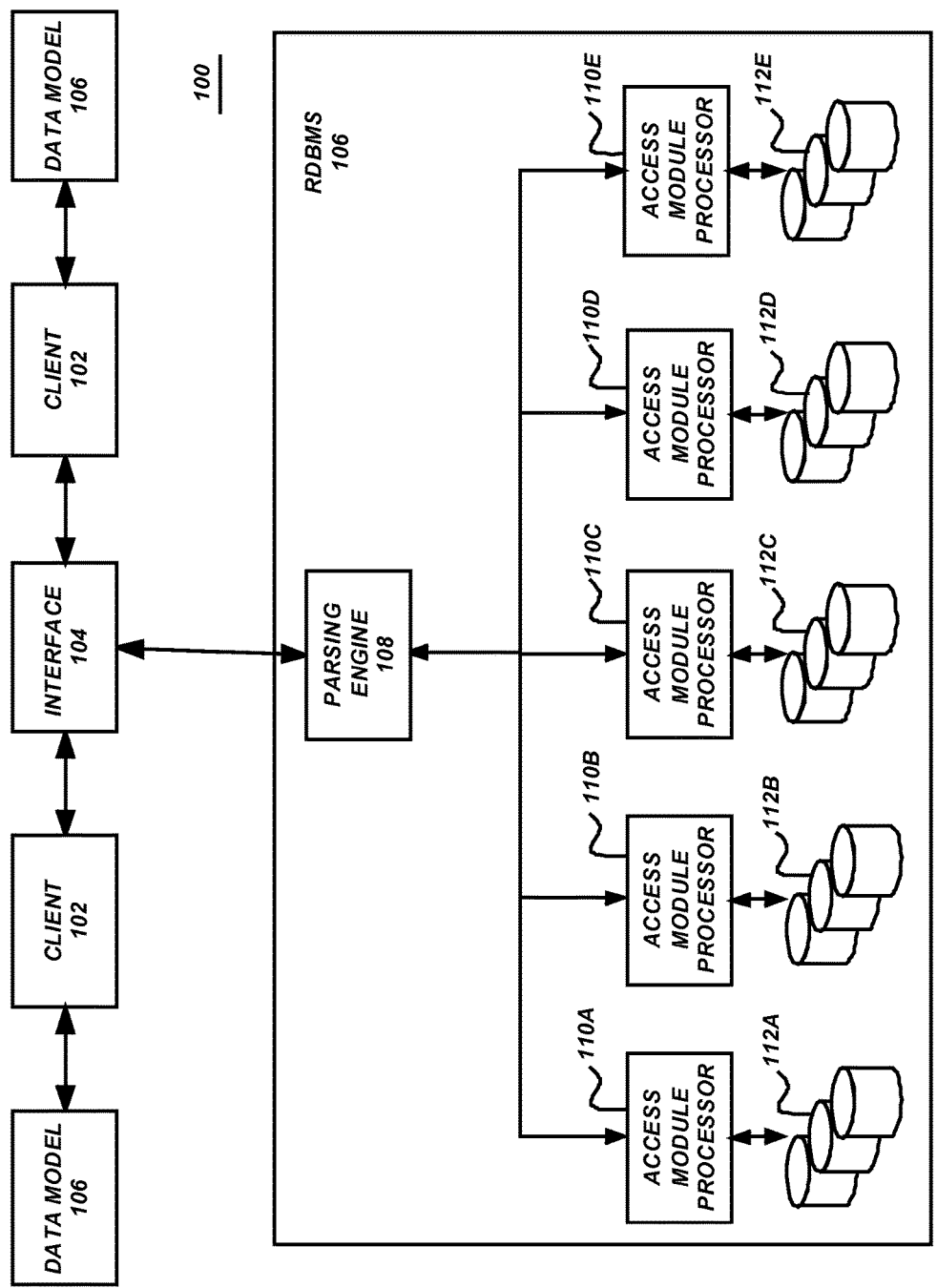
FIG. 1 illustrates an exemplary hardware and software environment according to one or more embodiments of the present invention.

FIG. 1 illustrates an exemplary hardware and software environment according to one or more embodiments of the present invention. In the exemplary environment, a computer system 100 implements an improved MDM framework 100, in a three-tier client-server architecture, wherein the first or client tier provides clients 102 that may include, inter alia, a graphical user interface (GUI), the second or middle tier provides an interface 104 for performing functions and interfacing with a central database or data warehouse, and the third or server tier comprises the central database or data warehouse (also referred to as a Relational DataBase Management System (RDBMS) 106) that stores data and metadata in a relational database. Such an RDBMS 106 is utilized to store the master data and provide a standard format within framework 100 for the master data. The first, second, and third tiers may be implemented in separate machines, or may be implemented as separate or related processes in a single machine.

In one or more embodiments, the RDBMS 106 includes at least one parsing engine (PE) 108 and one or more access module processors (AMPs) 110A-110E storing the relational database in one or more data storage devices 112A-112E. The parsing engine 108 and access module processors 110 may be implemented in separate machines, or may be implemented as separate or related processes in a single machine. The RDBMS 106 used in the preferred embodiment comprises the Teradata® RDBMS sold by Teradata™ US, Inc., the assignee of the present invention, although other DBMS's could be used. In this regard, Teradata® RDBMS is a hardware and software based data warehousing and analytic application/database system.

Generally, clients 102 include a graphical user interface (GUI) for operators or users of the system 100, wherein requests are transmitted to the interface 104 to access data stored in the RDBMS 106, and responses are received therefrom. In response to the requests, the interface 104 performs the functions described below, including formulating queries for the RDBMS 106 and processing data retrieved from the RDBMS 106. Moreover, the results from the functions performed by the interface 104 may be provided directly to clients 102 or may be provided to the RDBMS 106 for storing into the relational database. Once stored in the relational database, the results from the functions performed by the interface 104 may be retrieved more expeditiously from the RDBMS 106 via the interface 104. Further, each client 102 may have other data models 106.

Note that clients 102, interface 104, and RDBMS 106 may be implemented in separate machines, or may be implemented as separate or related processes in a single machine. Moreover, in one or more embodiments, the system 100 may use any number of different parallelism mechanisms to take advantage of the parallelism offered by the multiple tier architecture, the client-server structure of the client 102, interface 104, and RDBMS 106, and the multiple access module processors 110 of the RDBMS 106. Further, data within the relational database may be partitioned across multiple data storage devices 112 to provide additional parallelism.

Generally, the clients 102, interface 104, RDBMS 106, parsing engine 108, and/or access module processors 110A-110E comprise logic and/or data tangibly embodied in and/or accessible from a device, media, carrier, or signal, such as RAM, ROM, one or more of the data storage devices 112A-112E, and/or a remote system or device communicating with the computer system 100 via one or more data communications devices. The above elements 102-112 and/or operating instructions may also be tangibly embodied in memory and/or data communications devices, thereby making a computer program product or article of manufacture according to the invention. As such, the terms "article of manufacture," "program storage device" and "computer program product" as used herein are intended to encompass a computer program accessible from any computer readable device or media. Accordingly, such articles of manufacture are readable by a computer and embody at least one program of instructions executable by a computer to perform various method steps of the invention.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.
Hardware and Software Environment Details As described above with respect to FIG. 1, the master data is stored in RDBMS 106 and is accessed by clients 102 via interface 104. Such client 102 access through interface 104 is enabled by MDM sanctioned data processes referred to as workflows (e.g., provided in interface 104). Rather than being provided via interface 104, such workflows may be provided as part of parsing engine 108 or be provided by the AMPs 110 (or other parts of RDBMS 106). Consumer applications and processes may execute on clients 102 and may need to receive data from the RDBMS 106.

As described above, it is desirable for customers in a MDM context to have the ability to search for a certain entity, view it in the hierarchy, and then launch a maintenance workflow for that record. However, the prior art fails to provide such capabilities. The Adobe™ Flex™ technology provides a capability to represent and view an entity using a hierarchy Flex™ UI. However, there is no ability to use the hierarchy Flex™ UI within an MDM workflow. Similarly, a PGL workflow UI provides the ability to search for an entity and launch a maintenance workflow for that record. The issue is to allow the PGL workflow UI to interact with Adobe™ Flex™ based technologies. Embodiments of the invention bridge the gap between a PGL workflow UI framework and the Adobe™ Flex™ technologies.

Embodiments of the invention enhance the existing PGL Workflow UI framework to allow the Hierarchy Flex™ UI to be incorporated into the PGL based workflows. This enhanced framework recognizes both the PGL elements and the Flex™ elements and allows data interchange between them. To provide the enhanced framework a new element (XML [extensible markup language] tag) is included/added that can identify the Flex™ component.

To provide the continued ability to represent and view an entity in a hierarchical manner, a Hierarchy Viewer may be built using Adobe™ Flex™. The Flex™ code is compiled at build time and a 'swf' file is produced. The swf file is distributed as part of the MDM install. Most modern browsers have a plug-in for Flash™, aka Flash Player™, installed on their computer. SWF files can be embedded in an html file for rendering on browsers.

The PGL framework is enhanced to add a swf component to a PGL workflow file so that workflow authors can incorporate any swf component in their PGL workflows. By embedding the swf component into a PGL workflow, bi-directional interaction is achieved.

For the Flex™ components supplied with MDM, like Hierarchy Manager and Viewer, standard entry and exit points, including any necessary parameters, can be defined and published in the MDM documentation for usage. In addition, a sample workflow can be published to explain the swf component usage.

Details of Interaction Between Flex™ and PGL

MDM has capabilities to build and execute workflows. As described above, workflows are processes used by clients (e.g., via interface 104) to access master data. Workflows can be authored using MDM's Studio IDE™ (integrated development environment). Each workflow can support a range of pre-built nodes. One such node is the UI node.

Figure 2:
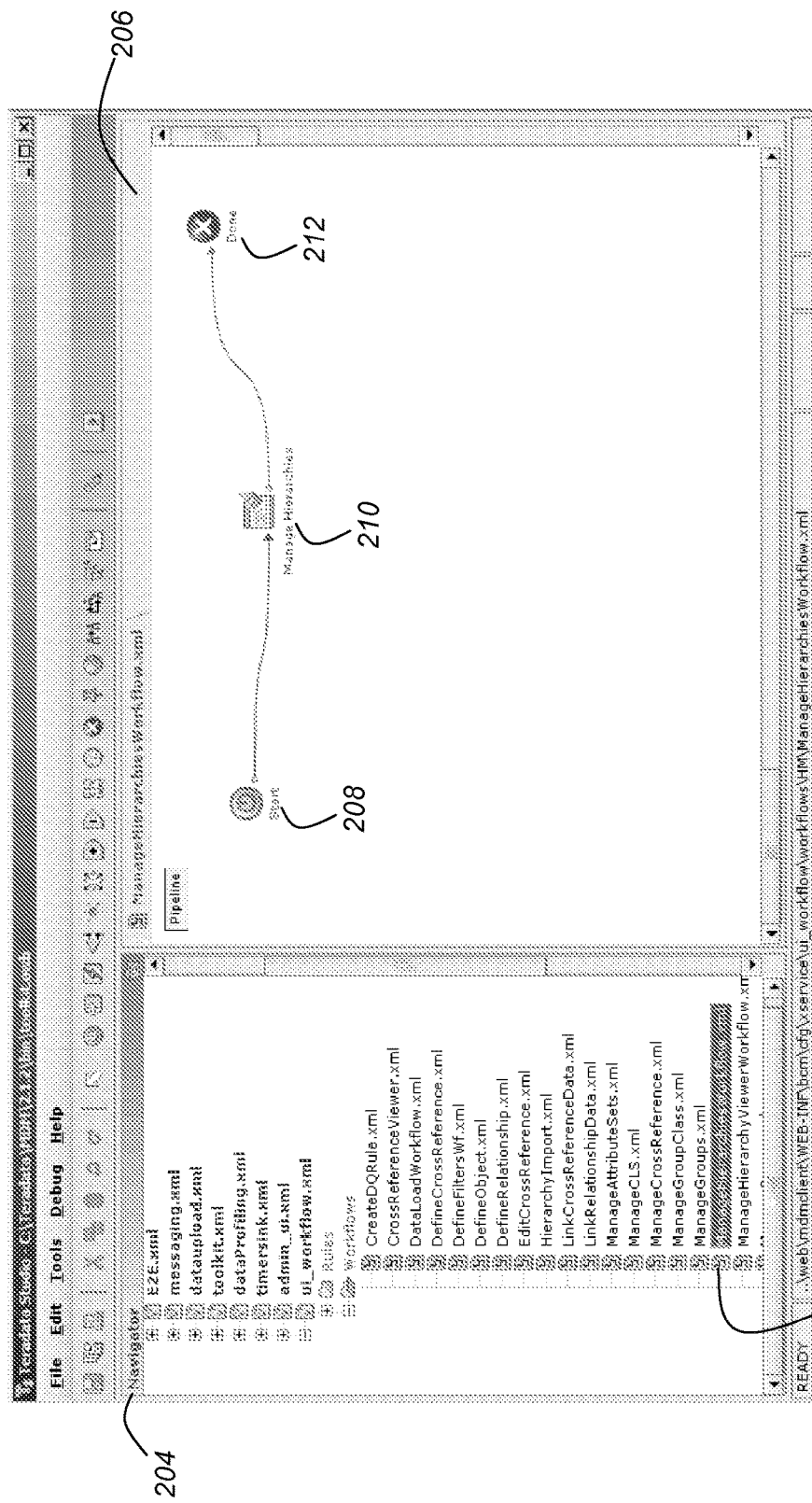
FIG. 2 illustrates an exemplary graphical user interface of a workflow in accordance with one or more embodiments of the invention.

FIG. 2 illustrates an exemplary graphical user interface of a workflow in accordance with one or more embodiments of the invention. As illustrated, the MDM Studio IDE™ is being used to author a workflow. The user has selected the "ManageHierarchiesWorkflow.xml" workflow 202 in the navigator panel 204. A graphical representation of the pipeline/workflow is displayed in area 206. There are three nodes in workflow 202—the start node 208, the ManageHierarchies UI node 210, and the done node 212. When a user double clicks the UI node 210, the action opens up the contents of the UI node. The UI node has a link to a PGL file that can describe the UI components to display when the workflow is executed.

PGL is a powerful and flexible markup language for describing user interfaces of interactive web applications.

Figure 3:
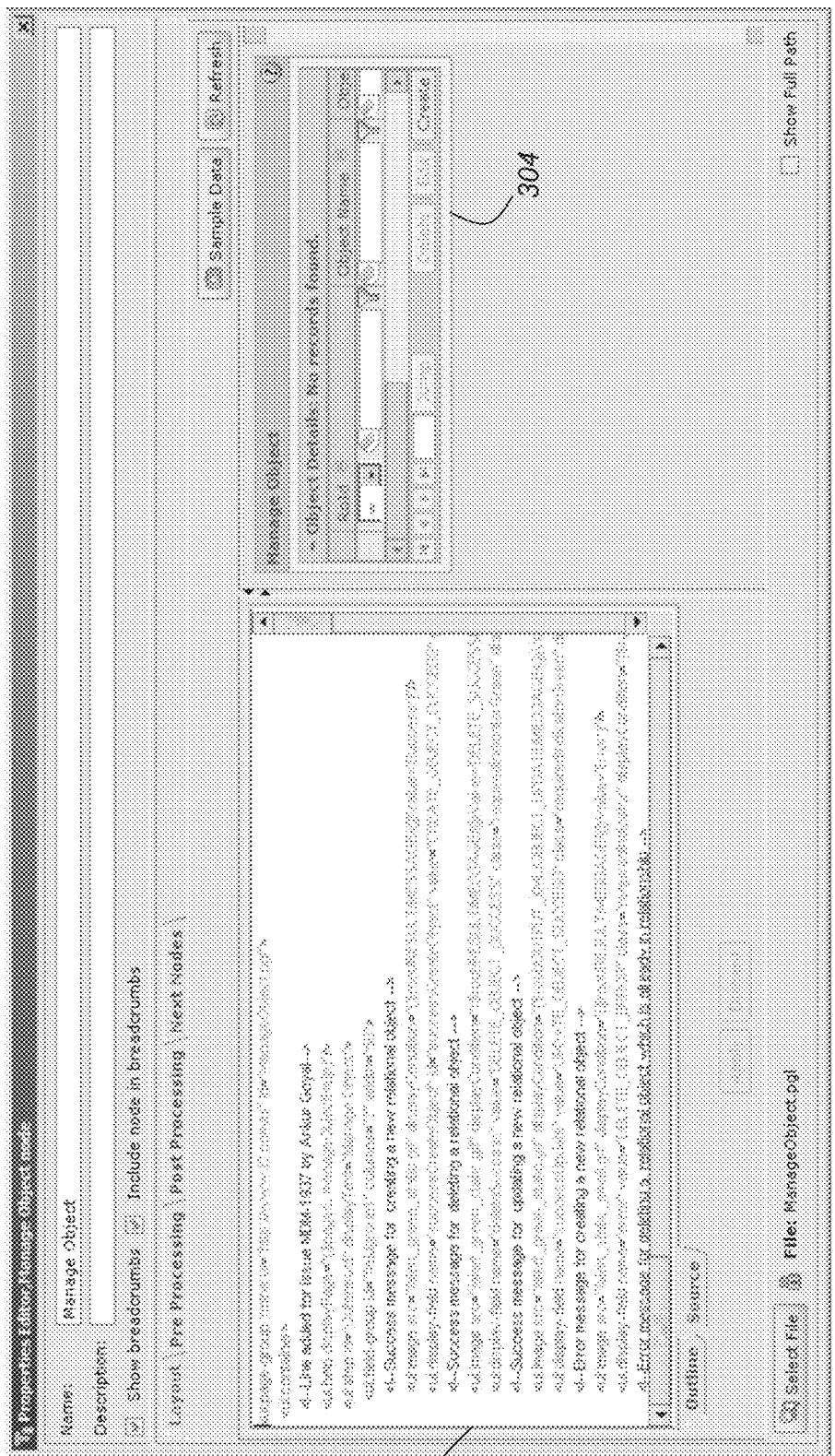
FIG. 3 is a graphical user interface illustrating the layout tab of a UI node in accordance with one or more embodiments of the invention.

FIG. 3 is a graphical user interface illustrating the layout tab of a UI node (a "Manage Object" UI node) in accordance with one or more embodiments of the invention. In panel 302, the source code for the user interface is displayed. In panel 304, details/properties/attributes of the manage object node may be defined by the user.

Embedding Flex™ (swf) Inside PGL

To provide for the interaction between PGL and Flex™, Flex™ may be embedded within a PGL file. PGL has a number of UI components that are commonly used (e.g., ui:container, ui:button, etc.).

Embodiments of the invention provide a new component/tag named "ui:swf" to handle Flex™ based UIs.

Table A provides an exemplary use of the new component.

TABLE A

<ui:page-group xmlns:ui="http://www.teradata.com/ui" Id="HierarchyManagerNode.pgl">
  <ui:swf id="id1" height="100%" width="100%" source="bcm\HM\HierarchyManager.swf">
    <ui:flash-var id="param1" value="someValue" />
    <ui:flash-var id="param2" value="someOtherValue" />
  </ui:swf>
  <ui:script>
    function flexTest1(value)
    {
        var url = omxContextPath+"/start.x2ps?START_WORKFLOW=ManageHierarchy";
        document.form.action = url;
        document.form.submit( );
    }
  </ui:script>
</ui:page-group>

As depicted in Table A, the underscored code are PGL code. The non-underscored code is the new UI component used to embed swf file in the PGL code. When the PGL code is rendered in the user's browser, the swf component is played with the help of the browser's Flash™ player plug-in.

The source attribute in the ui:swf tag points to the swf file (e.g., "HierarchyManager.swf") with respect to the context root of the web application. Further, the ui:flash-var tags provide parameters that may be passed to the swf file.

The PGL code of Table A further provides for the execution of a script (e.g., ui:script) that executes a flexTest1 function that provides for starting the ManageHierarchy workflow process.

Passing Parameters from PGL to Flex

As described above, one may also pass parameters to the swf file using the "ui:flash-var" element within the "ui:swf" PGL component. Table B illustrates sample code for passing parameters in accordance with embodiments of the invention.

TABLE B

<ui:page-group xmlns:ui="http://www.teradata.com/ui" Id="HierarchyManagerNode.pgl">
  <ui:swf id="id1" height="100%" width="100%" source="bcm\HM\HierarchyManager.swf">
    <ui:flash-var id="param1" value="someValue" />
    <ui:flash-var id="param2" value="someOtherValue" />
  </ui:swf>

In Table B, there are two parameters (param1 and param2) being passed from PGL to Flex™ swf. The swf file is internally made up of mxml and actionscript code. Table C illustrates a snippet of the mxml code.

TABLE C

```
<?xml version="1.0" encoding="utf-8"?>
<mx:Application xmlns:mx="http://www.adobe.com/2006/mxml"
layout="absolute" initialize="load('true')" usePreloader="true">
    <mx:Script>
    [Bindable]
    public var param1 : String="FlexDefault1";
    [Bindable]
    public var param2 : String="FlexDefault2";
    public function load( initialLoader : String):void
    var param2Temp : String=Application.application.parameters.param2
    as String
    var paramTemp : String=Application.application.parameters.param1
    as String
```

As illustrated in Table C, the parameters (param1 and param2) that are passed in from the PGL code are used in the mxml code (see last two underscored lines of Table C). In this regard, the underscored text of the mxml snippet if Table 3 is capable of reading an input parameter passed to a swf file. Thus PGL can communicate with Flex™.

Passing Parameters from Flex™ to PGL

In addition to passing information from PGL to Flex™ via the new tag described above, information/parameters may also be passed from Flex™ code to PGL. The mxml code in Flex™ is capable of invoking external interfaces. One such interface is Javascript™.

Table D illustrates a snippet of the mxml code that can invoke the accompanying Javascript™ code in the PGL.

TABLE D

```
<?xml version="1.0" encoding="utf-8"?>
<mx:Application xmlns:mx="http://www.adobe.com/2006/mxml"
layout="absolute" initialize="load('true')"
usePreloader="true">
    import mx.controls.Alert;
    import flash.external.ExternalInterface;
<mx:Script>
...
public function javaScriptTest( ):void{
if(ExternalInterface.available)
Alert.show("calling javascript");
var invokeJS : String = ExternalInterface.call("flexTest1","Passed from
Flex");
}
}
]]>
</mx:Script>
...
</mx:Application>
```

As described above, the PGL file contains a range of UI components. The PGL file may also contain script component that can contain Javascript™ code. Table E is a snippet of the PGL code that has the Javascript™ component.

TABLE E

```
<ui:page-group xmlns:ui="http://www.teradata.com/ui"
Id="HierarchyManagerNode.pgl">
...
    <ui:swf id="id1" height="100%" width="100%"
source="bcm\HM\HierarchyManager.swf">
        <ui:flash-var id="param1" value="someValue" />
        <ui:flash-var id="param2" value="someOtherValue" />
    </ui:swf>
...
    <ui:script>function flexTest1(value)
    {
      alert(value);
      form.BUTTON_ID.value = "Next" ;
      form.submit( );
    }
```

TABLE E-continued

```
</ui:script>
...
```

As illustrated in Table E, the "script" tag contains the Javascript™ component that is used to perform a test using the alert function (passed a parameter from the swf file) and a form (e.g., with a button). Accordingly, Flex™ can now call Javascript™ which can invoke the PGL code or advance the workflow.

Logical Flow

Figure 4:
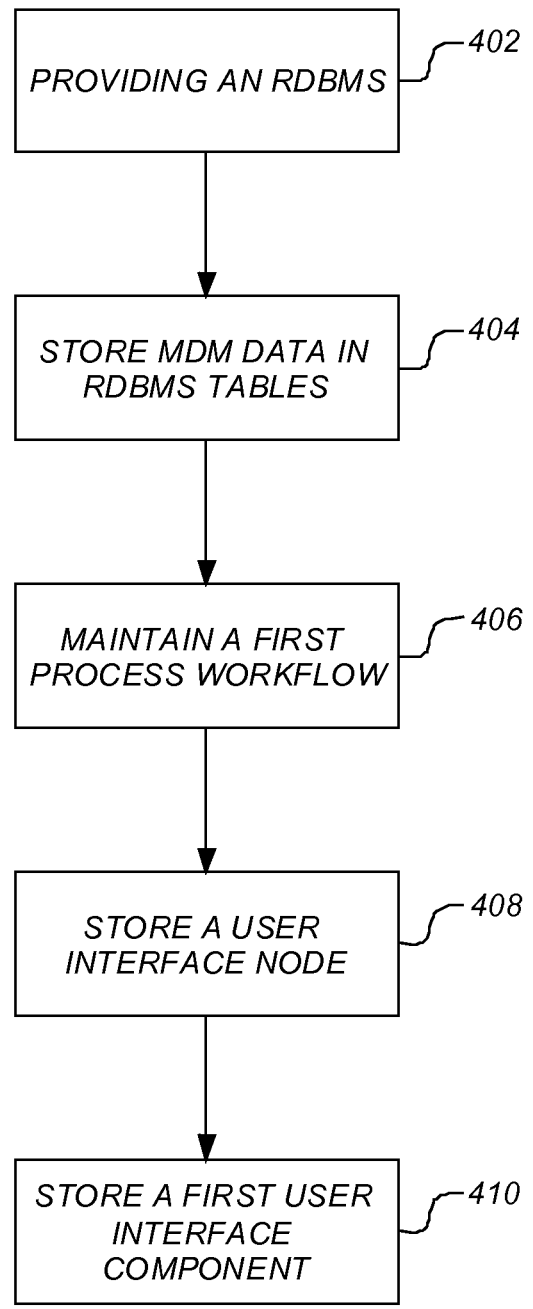
FIG. 4 is a flow chart illustrating the logical flow for visualizing MDM data as part of an MDM workflow user interface in a computer system in accordance with one or more embodiments of the invention.

FIG. 4 is a flow chart illustrating the logical flow for visualizing MDM data as part of an MDM workflow UI in a computer system in accordance with one or more embodiments of the invention. At step 402, a relational database management system (RDBMS) is provided in a computer system.

At step 404, MDM data is stored in tables of the RDBMS.

At step 406, a first process workflow is maintained as part of a process and framework. The first process workflow manages relationship data. Relationship data is the MDM data required to manage an association of one piece of MDM data (i.e., in the RDBMS tables) to another piece of MDM data.

At step 408, a UI node is stored in the first process workflow. The UI node provides a link to a file that describes UI components to display when the first process workflow is executed. The UI node may be a PGL element.

At step 410, a first component of the UI components is stored. The first component identifies an Adobe™ Flex™ based UI component that represents and views the MDM data in a hierarchy/hierarchical fashion. The first component can be specified using an extensible markup language (XML) tag. Further, the first component can identify a Shockwave™ Flash™ (swf) file that is embed into the UI node. The swf file is played using a Flash™ player when rendered on a browser.

In addition, parameters can be passed to the Adobe™ Flex™ based UI component using a tag within the first component. Similarly, the Adobe™ Flex™ based UI component can pass parameters to another UI component (e.g., to PGL code) by invoking an external interface such as Javascript™.

CONCLUSION

This concludes the description of the preferred embodiment of the invention. The following paragraphs describe some alternative embodiments for accomplishing the same invention. In one alternative embodiment, any type of computer or configuration of computers could be used to implement the present invention. In addition, any database management system, decision support system, on-line analytic processing system, or other computer program that performs similar functions could be used with the present invention.

In view of the above, one may note that the Hierarchy Viewer offers a significant competitive advantage, as it offers a new capability that is integrated directly into the Master Data Management Framework. Most Hierarchy Management systems require users to separate their hierarchical data from their business critical data. Hierarchical data is usually processed outside the normal business flow, and must be re-incorporated back into the centralized data store, and re-integrated with their business critical data. Embodiments of the invention directly integrate the management and visualization of hierarchical data with Master Data Management. This allows for customers to view, visualize, and interact with data in a hierarchical format, while allowing this data to remain under the control of the Master Data Management Framework. Embodiments of the invention further add significant new capabilities to the Master Data Management offering. In addition, an MDM Development team need not learn Adobe™ Flex™ as this would provide a seamless integration of Flex™ within the PGL based UI.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system to visualize master data management data as part of a master data management workflow user interface in a computer system, comprising:
   a relational database management system (RDBMS) executing in the computer system, wherein the RBDMS is configured to store master data management data that resides in one or more tables; and
   a master data management system executable in the computer system to maintain, as part of a process and framework, a first process workflow to manage relationship data that is included in the master data management data and is indicative of an association of one piece of master data management data to another piece of master data management data, wherein the computer system is configured to display the first process workflow, wherein the first process workflow comprises a selectable user interface (UI) node, wherein the selectable UI node comprises a link to a source code file comprising a programming language that defines one or more UI components configured to construct a user interface, wherein selection of the UI node displays contents of the source code file, wherein the source code file is executable to generate a visual representation of the one or more UI components on a display as part of the user interface when the first process workflow is executed, wherein a first component of the one or more UI components is an Shockwave™ Flash™ (swf)-file-based UI component executed through the programming language, and wherein the swf-file-based UI component is configured to represent and view the master data management data in a hierarchy.

2. The system of claim 1, wherein the selectable UI node comprises a PGL (professional graphics language) element.

3. The system of claim 1, wherein the first component comprises an extensible markup language (XML) tag.

4. The system of claim 1, wherein:
   the first component identifies a swf file that is embed into the selectable UI node; and
   the swf file is played using a player when rendered on a browser.

5. The system of claim 4, wherein one or more parameters are passed to the swf-file-based UI component using a tag within the first component.

6. The system of claim 1, wherein the swf-file-based UI component passes parameters to another UI component by invoking an external interface.

7. The system of claim 6, wherein the external interface comprises Javascript™.

8. An article of manufacture comprising a non-transitory program storage device readable by a computer, tangibly embodying at least one program of instructions executable by the computer to perform method steps of visualizing master data management data as part of a master data management workflow user interface in a computer system, the method steps comprising:
   providing a relational database management system (RDBMS) in the computer system;
   storing master data management data in one or more tables in the RDBMS;
   maintaining, as part of a process and framework, a first process workflow to manage relationship data that is included in the master data management data, the relationship data being required to manage an association of one piece of master data management data to another piece of master data management data; and
   generating a display of the first process workflow, wherein the first process workflow comprises a selectable user interface (UI) node, wherein the selectable UI node comprises a link to a source code file comprising a programming language that defines one or more UI components configured to construct a user interface, wherein selection of the UI node displays contents of the source code file, wherein the source code file is executable to generate a visual representation of the one or more UI components on a display as part of the user interface when the first process workflow is executed, wherein a first component of the one or more UI components is an Shockwave™ Flash™ (swf)-file-based UI component executed through the programming language, and wherein the swf-file-based UI component is configured to represent and view the master data management data in a hierarchy.

9. The article of manufacture of claim 8, wherein the selectable UI node comprises a PGL (professional graphics language) element.

10. The article of manufacture of claim 8, wherein the first component comprises an extensible markup language (XML) tag.

11. The article of manufacture of claim 8, wherein:
    the first component identifies a swf file that is embed into the selectable UI node; and
    the swf file is played using a player when rendered on a browser.

12. The article of manufacture of claim 11, wherein one or more parameters are passed to the swf-file-based UI component using a tag within the first component.

13. The article of manufacture of claim 8, wherein the Adobe™ Flex™ swf-file-based UI component passes parameters to another UI component by invoking an external interface.

14. The article of manufacture of claim 13, wherein the external interface comprises Javascript™.

15. A computer-implemented method for visualizing master data management data as part of a master data management workflow user interface in a computer system comprising:
    providing a relational database management system (RDBMS) in the computer system;
    storing master data management data in one or more tables in the RDBMS;
    maintaining, as part of a process and framework, a first process workflow to manage relationship data that is included in the master data management data, the relationship data being required to manage an association of one piece of master data management data to another piece of master data management data; and generating a display of the first process workflow, wherein the first process workflow comprises a selectable user interface (UI) node, wherein the selectable UI node comprises a link to a source code file comprising a programming language that defines one or more UI components configured to construct a user interface, wherein selection of the UI node displays contents of the source code file, wherein the file is executable to generate a visual representation of the one or more UI components on a display as part of the user interface when the first process workflow is executed, wherein a first component of the one or more UI components identifies an Shockwave™ Flash™ (swf)-based UI component executed through the programming language, and wherein the swf-file-based UI component is configured to represent and view the master data management data in a hierarchy.

16. The method of claim 15, wherein the selectable UI node comprises a PGL (professional graphics language) element.

17. The method of claim 15, wherein the first component comprises an extensible markup language (XML) tag.

18. The method of claim 15, wherein:
the first component identifies a (swf) file that is embed into the selectable UI node; and
the swf file is played using a player when rendered on a browser.

19. The method of claim 18, wherein one or more parameters are passed to the swf-file-based UI component using a tag within the first component.

20. The method of claim 15, wherein the swf-file-based UI component passes parameters to another UI component by invoking an external interface.

21. The method of claim 20, wherein the external interface comprises Javascript™.

* * * * *